United States Patent Office.

A. G. HUNTER, OF FLINT, GREAT BRITAIN.

Letters Patent No. 78,375, dated May 26, 1868.

---

IMPROVEMENT IN THE MANUFACTURE OF SODA AND POTASH.

---

The Schedule referred to in these Letters Patent and making part of the same.

---

TO ALL WHOM IT MAY CONCERN:

Be it known that I, A. G. HUNTER, of Flint, Wales, temporarily residing in Fair Haven, in the county of New Haven, and State of Connecticut, have invented a new Improvement in Manufacture of Soda and Potash; and I do hereby declare the following to be a full, clear, and exact description of the same.

The object of this invention is to effect the conversion of silicate of soda or silicate of potash into the corresponding carbonated alkali, by means of bicarbonate of lime, that is, carbonate of lime dissolved by an excess of carbonic acid.

I effect this by mixing the alkaline silicate to be treated with a solution of bicarbonate of lime, whereby silicate of lime and alkaline bicarbonate are produced. This double decomposition may be effected at ordinary temperatures, and is facilitated when performed in contact with carbonic acid. The solution of bicarbonate of lime may be prepared by acting on lime or carbonate of lime suspended in water by carbonic acid.

Several forms of apparatus may be employed to carry out this invention. Among others I may mention—

First, open tanks or vessels, provided with agitators, to effect the suspension, in water, of the lime or carbonate of lime, while being dissolved by carbonic acid brought in contact with the liquid, and to effect a thorough mixture of the alkaline silicate to be treated, (which is most conveniently added as a solution,) with the solution of bicarbonate of lime, and subsequently, when the precipitated silicate of lime has settled, and the solution of alkaline carbonate has been run off therefrom, to wash the said silicate of lime free from adhering alkaline salts.

The carbonic acid may be derived from several sources, among others, from burning coal, or from a lime-kiln, and may be brought in contact with the liquid by a draught, or by a fan, or injected into the liquid by means of an air-pump.

Second, a tower, provided with shelves or diaphragms, placed at a slight inclination, and so arranged that the lime or carbonate-of-lime liquor, when introduced on the top shelf of the tower shall, in flowing downwards from shelf to shelf, describe a zigzag course from side to side of the tower, while the carbonic-acid gas, being admitted at the bottom of the tower, ascends and meets the descending liquid, and converts the lime or carbonate of lime into bicarbonate of lime, which may then be used to decompose the alkaline silicate.

Third, closed tanks or vessels capable of standing pressure, and provided with agitators and suitable inlets and outlets, in which the solution of bicarbonate of lime may be prepared under pressure, and the decomposition of the alkaline silicate to be treated also effected under pressure produced by injection of carbonic acid. In using this form of apparatus, the alkaline silicate may be pumped in as a solution, or it may be placed in the apparatus at the same time as the lime or carbonate of lime and water are, and the whole agitated, together with injection of carbonic acid, till it is found, by testing a sample obtained by a gauge-cock, that the alkaline silicate is converted into carbonate. When this point is reached, the injection of carbonic acid and the agitator are stopped, the silicate of lime allowed to settle, the solution of alkaline carbonate subsequently run off, and the residuary silicate of lime washed with water, to free it of alkaline salts. By this form of apparatus, more concentrated solutions may be obtained than in open vessels, and the greater the pressure, the more concentrated solution may be obtained.

The silicate of lime may be used for glass-making, and the solutions of carbonated alkali may either be used as such, or by concentration at low temperature or *in vacuo* may be obtained as alkaline bicarbonate, (vacuum-pans, such as sugar-refiners use, may be here advantageously employed,) or by concentration by boiling may be obtained as crystallized carbonated alkali, or, by boiling to dryness, as dry carbonated alkali, or, if causticized by lime, may be obtained as caustic alkali. The respective modes of such concentration, evaporation, or causticizing are well known to practical chemists.

The respective quantities of bicarbonate of lime, and of the alkaline silicate to be treated, are determined by their equivalents, which are well known to chemists.

Having thus fully described my invention, what I claim as new, and desire to secure by Letters Patent, is—

The process of converting silicate of soda or silicate of potash into the corresponding carbonate, by double decomposition with bicarbonate of lime, as substantially described herein.

A. G. HUNTER.

Witnesses:
J. H. SHUMWAY,
A. J. TIBBITS.